May 8, 1923.
J. C. BROWN
INSECT TRAP
Filed July 31, 1919
1,454,667
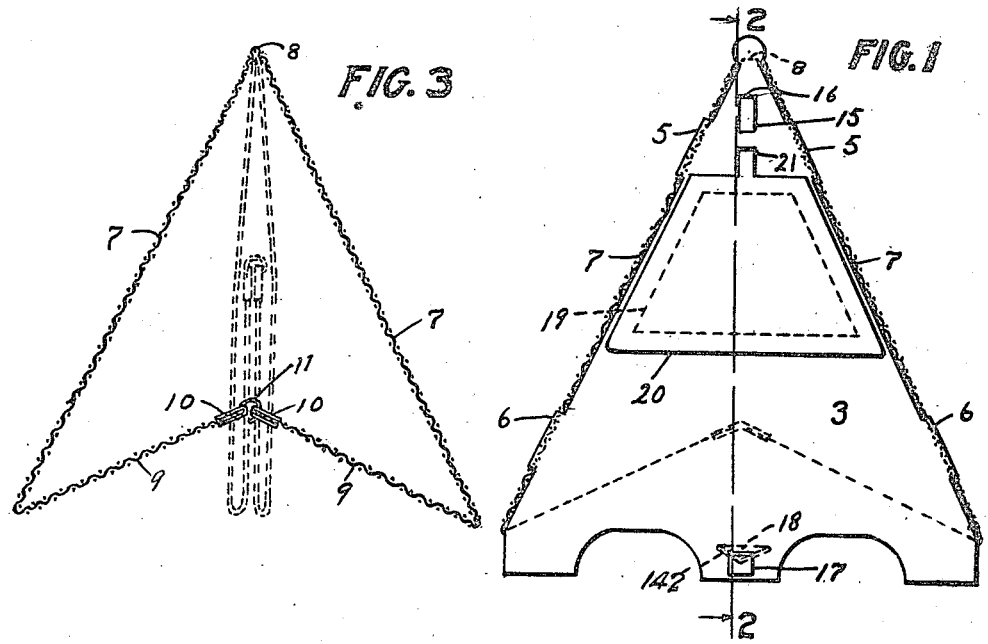
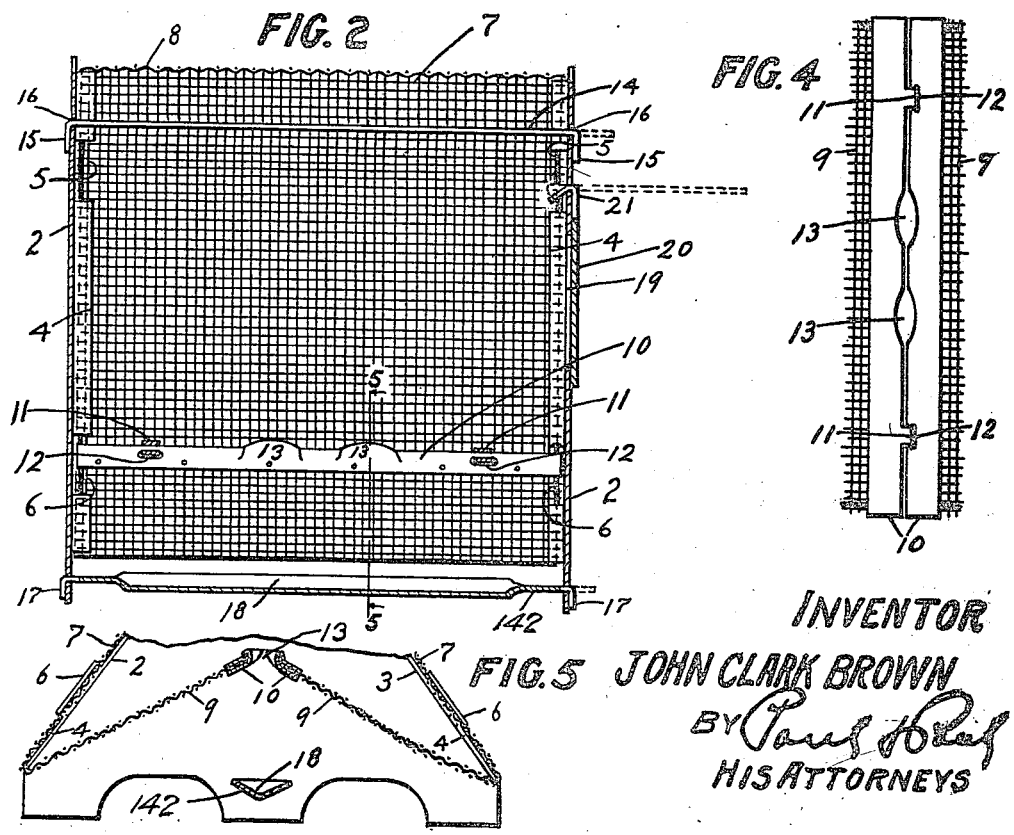
INVENTOR
JOHN CLARK BROWN
BY
HIS ATTORNEYS Patented May 8, 1923.

1,454,667

UNITED STATES PATENT OFFICE.

JOHN CLARK BROWN, OF MINNEAPOLIS, MINNESOTA.

INSECT TRAP.

Application filed July 31, 1919. Serial No. 314,489.

*To all whom it may concern:*

Be it known that I, JOHN CLARK BROWN, a citizen of the United States, resident of Minneapolis, county of Hennepin, State of Minnesota, have invented certain new and useful Improvements in Insect Traps, of which the following is a specification.

The object of my invention is to provide an insect trap of simple, inexpensive construction which can be easily knocked down and mailed or shipped in compact form and as readily set up by the purchaser or user.

A further object is to provide a trap of this type which, through its knock-down characteristics, can be carried conveniently in stock without occupying so much room on the shelves and thereby being open to the objections of the merchants to handling traps of this kind as usually made.

Other objects of the invention will appear from the following detailed description.

The invention consists generally in various constructions and combinations, all as hereinafter described and particularly pointed out in the claim.

In the accompanying drawings forming part of this specification,

Figure 1 is an end view of a collapsible insect trap embodying my invention,

Figure 2 is a sectional view on the line 2—2 of Figure 1,

Figure 3 is a view with the end panels removed, showing the manner of folding the wire fabric, Figure 4 is a detail bottom view illustrating the openings through which the insects enter the trap, Figure 5 is a sectional view on the line 5—5 of Figure 2, In the drawing, 2 and 3 represent the end panels of the trap. These are preferably triangular in form, tapered from the base to the top and are provided with inwardly turned edges 4 at right angles substantially to the main portion of the panels and from these edges at points preferably near the top and bottom of the panels lips 5 and 6 are pressed, said lips being offset from the edges out of which they are pressed to allow the insertion of the edges of the wire fabric 7 between them. This fabric comprises a sheet bent transversely at 8 to form a triangular portion and having upwardly and inwardly turned edge portions 9 extending into the space between the sides of the triangular portion and beneath the apex thereof.

The portions 9 are provided at their abutting edges with protecting bands 10 secured thereto, one band having tongues 11 formed thereon to enter slots 12 in the other band for holding them in their proper relative position. At suitable intervals openings 13 are formed between the bands to allow the insects to crawl up into the space within the fabric as usual in traps of this type. When the fabric is removed from the end panels, it may be folded to the dotted line position shown in Figure 3 and will then occupy but little space and can be placed in an envelope or other container for convenience in mailing or shipping.

Generally traps of this kind are handled in set-up form and while light are bulky and merchants object to carrying any considerable stock of them on account of their bulk and the inconvenience in mailing or shipping them. With this device, when the end panels are disengaged from the fabric portion, the complete collapse of the trap may be effected and all the parts may be placed in very compact form for delivery or shipment.

The panels, when assembled, may be secured by any suitable means and I prefer to provide a top bar 14 having tongues 15 formed on the ends thereof to pass through slots 16 in the panels and be folded down to lock the panels in parallel relation and hold them and the fabric snugly together.

At the bottom, preferably in the center of the panels, a similar bar 142 is provided having tongues 17 to pass through slots in the panels by means of which the panels in the fabric may be securely bound together.

I also prefer to provide a trough-like depression 18 in the bar 142 in which a quantity of sugar, syrup or the like may be placed to attract the insects.

One of the panels is preferably provided with a comparatively large opening 19 normally covered by a flap 20 that is hinged at 21. Through this opening the trap may be emptied of its contents.

The trap may, of course, be made in different sizes and in various ways the details of construction may be modified and still be within the scope of my invention.

I claim as my invention:

A collapsible insect trap comprising a wire fabric folded transversely to form side walls, the edges of said walls being folded inwardly and upwardly and hinged together with openings for the passage of insects between them, said fabric folding to a substantially flattened form, panels having inwardly turned edges and tongues formed thereon between which and said edges the ends of said walls are inserted, and bars passing through said panels at the top and bottom for securing them and said fabric together.

In witness whereof, I have hereunto set my hand this 25" day of July 1919.

JOHN CLARK BROWN.